United States Patent [19]
Vollebregt

[11] Patent Number: 5,761,776
[45] Date of Patent: Jun. 9, 1998

[54] LOCKING HOOK WITH INTEGRAL SEPARATOR

[75] Inventor: Richard Vollebregt, Brantford, Canada

[73] Assignee: 532341 Ontario Inc., Brantford, Canada

[21] Appl. No.: 791,293

[22] Filed: Jan. 30, 1997

[51] Int. Cl.⁶ .................. A44B 9/00; E04D 13/00
[52] U.S. Cl. ............. 24/706.1; 24/707.6; 24/709.6; 24/711.4; 52/63
[58] Field of Search ............... 24/706.1, 706, 24/706.2, 706.7, 706.8, 706.3, 706.4, 706.5, 706.9, 707.6, 708.6, 709.6, 711.4, 707, DIG. 29; 52/60, 63, 222; 160/84.06, 277

[56] References Cited

U.S. PATENT DOCUMENTS

| | | | |
|---|---|---|---|
| 2,086,767 | 7/1937 | Haas | 24/706.1 |
| 2,172,963 | 9/1939 | Payes | 24/706.1 |
| 2,556,400 | 6/1951 | Schwartz | 24/706.1 |
| 4,528,728 | 7/1985 | Schmidt et al. | 24/241 |
| 4,848,045 | 7/1989 | Nichols et al. | 52/60 |
| 4,909,466 | 3/1990 | Matthews | 248/303 |

*Primary Examiner*—Victor N. Sakran
*Attorney, Agent, or Firm*—Baker & Daniels

[57] ABSTRACT

A hook for suspending or supporting, from a rod or wire, a retractable roof covering used on greenhouses, comprises a pin for engaging the covering, a separator for preventing the covering material from contacting the rod or wire, and a locking mechanism for locking the pin and preventing the covering and rod or wire from being disengaged. The components of the hook are parts of a unitary body generally having a ring or loop shape.

14 Claims, 3 Drawing Sheets

LOCKING HOOK WITH INTEGRAL SEPARATOR

BACKGROUND OF THE INVENTION

1. Field of the Invention

The present invention relates to hooks for supporting retractable roof coverings used on greenhouses. More specifically, the invention relates to such hooks which have an integral separator to prevent damage to the roof covering material or the reinforcing tape used therewith and a locking means to prevent unfastening and to increase the hook's holding capacity.

2. Description of the Prior Art

In greenhouses, it is common for the roofs to be retractable and made of a fabric covering which can be pleated or folded. Such roof coverings are typically made of woven polyethylene or polypropylene and are suspended, by means of hooks, from wires or rods extending along the top of the greenhouse. Normally, such hooks are connected to a reinforcing tape which is then attached to the roof fabric.

In greenhouses having such a fabric roof covering, it is common for wind to cause the roof covering material to billow or flap thereby causing that part of the covering or reinforcing tape material which is joined to the hook to rub against the suspending rod or wire which, in turn, leads to damage of such material. Hooks having a means of separating the fabric from the wire have been proposed but involve a complicated method of assembly or use. Further, since many of the known hooks do not have a locking means, it is also common for such hooks to be disengaged from the supporting rod or wire or for the roof covering to slip off.

Various hooks have been proposed to address these individual problems; however, no one device has provided an adequate solution to both.

SUMMARY OF THE INVENTION

The present invention provides a hook which overcomes the deficiencies in the known devices. Specifically, the invention provides a hook for suspending a fabric roof covering from a support, the hook comprising a body generally in the form of a loop capable of being opened and closed, the body having: a first end comprising a pin for engaging the fabric; an opposing second end including a lock for engaging the pin; and a separator integral with the body and extending towards the center of the loop from a position on the body between the ends for separating the loop into first and second sections; wherein the first section is adapted to receive the fabric and the second section is adapted to receive the support; and, wherein the separator prevents contact between the fabric and the support.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
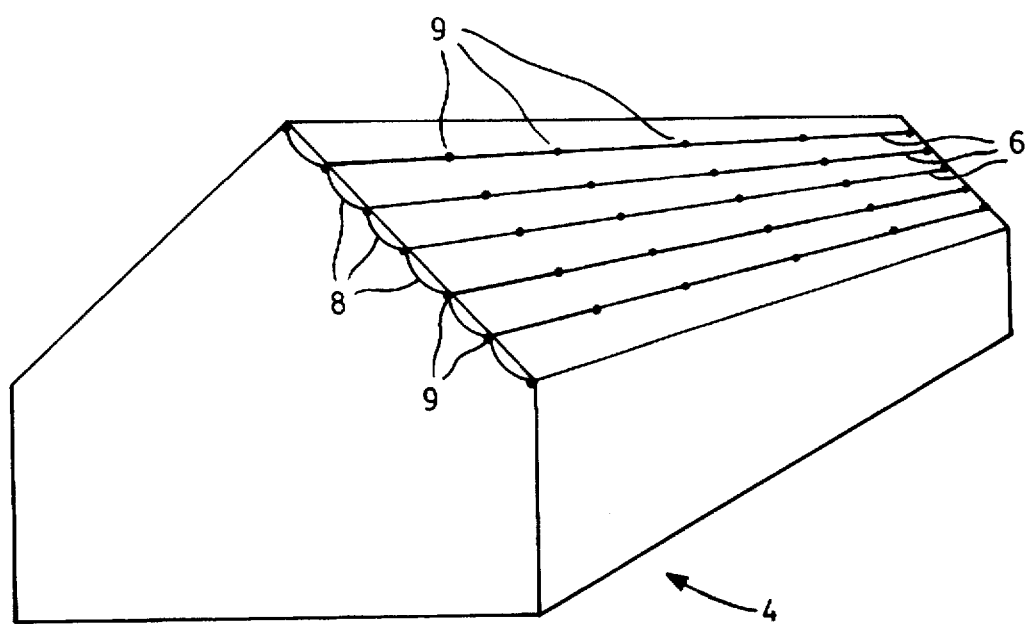
FIG. 1 is a perspective view of a greenhouse having a retractable fabric roof.

FIG. 1 illustrates a greenhouse having a roof comprised of a retractable fabric. The greenhouse 4 includes a series of wires 6 which extend along the length of the greenhouse connecting the tops of the end walls thereof. The wires 6 thereby form a series of supports for a fabric 8 which is suspended from the wires 6 by means of a plurality of hooks 9. In FIG. 1, the roof is shown in the closed position. When it is desired to open the roof, that is to expose the interior of the greenhouse, the fabric is retracted along the wires 6 to the desired position.

Figure 2:
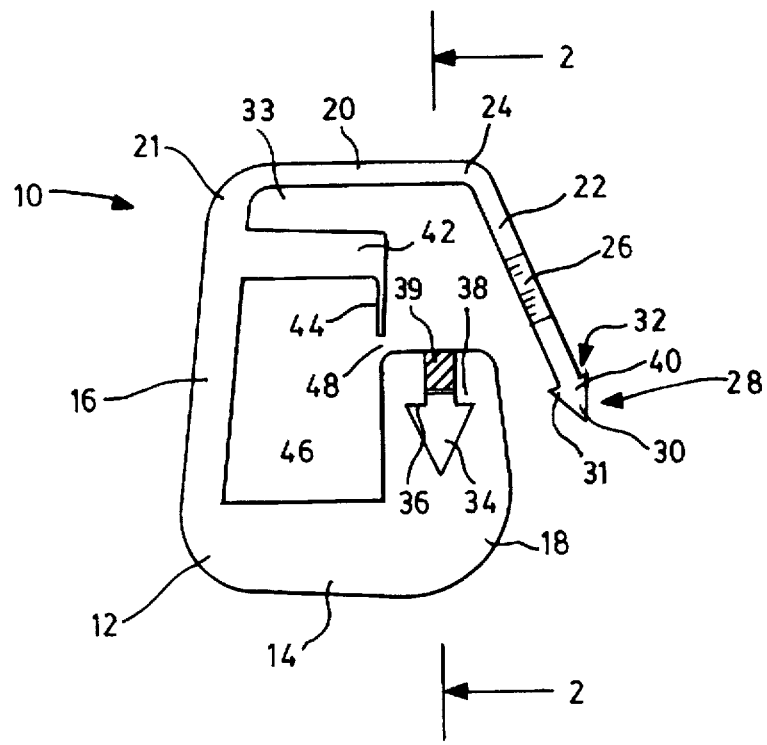
FIG. 2 side view of a hook according to a preferred embodiment of the invention when in an unlocked position.

In FIG. 2, a one piece hook according to a preferred embodiment of the invention is shown generally at 10. The hook is generally of a ring or loop shape which can be opened or closed and includes a lock to maintain the hook in the closed position. In the preferred embodiment, the hook has a main body 12, of a generally rectangular ring shape, having four sides defined by a base portion 14, a long leg 16 and a short leg 18 extending in the same direction from opposite ends of the base portion, and a lateral extension 20 extending from said long leg 16 towards the short leg 18 and creating a first elbow 21. A pin 22 depends from the lateral extension 20 and extends in a direction towards the short leg 18. The pin 22 is connected to the lateral extension 20 at a second elbow 24. In the preferred embodiment, the hook is made of a resilient material thereby allowing pin 22 to be moveable with respect to the body 12 while providing spring biasing for same so as to exert a force on the pin 22 to return it to the position shown in FIG. 2.

The pin 22 comprises an arm 26 and a head 28. The head 28, in the preferred embodiment, is generally of an arrowhead shape and comprises a point 30, for inserting the pin 22 through a reinforcing tape (not shown), and barbs 31. The arrowhead shape of the head 28 allows the pin to pierce through the tape material and prevents dislodging of same. Other shapes of the head may be used having the same result. The tape is in turn attached to the roof fabric being hung. The barbs 31 on the head 28 define shoulders 32. Once the pin is inserted through the reinforcing tape, the tape is slid over the pin and into a tape receiving section 33. In an alternative method, the hook may be attached directly to the roof fabric without the use of a reinforcing tape. However, the use of a reinforcing tape is preferred in order to prevent damage to the roof fabric.

Figure 3:
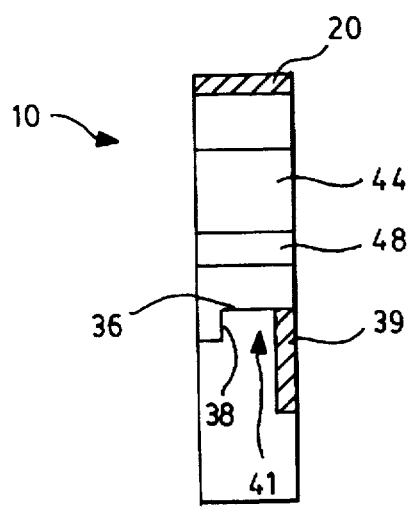
FIG. 3 is a side cross sectional view of the hook of FIG. 2 taken along the line 2—2.

The short leg 18 of the hook includes a recess 34 which is generally of the same shape as the head 28 on the pin 22 and adapted to receive same. The recess 34 includes first retaining walls 36 upon which the shoulders 32 impinge when the head 28 is inserted into the recess. The recess further includes second retaining walls 38 as shown in FIG. 3 upon which the face 40 of the head 28 impinges when the head is inserted into the recess. The recess also includes a rear wall 39 which prevents the head from passing through.

The hook further includes a separator arm 42 extending from the long leg 16. A separating flange depends from the separator arm 42 and extends away from the lateral extension 20. The separator arm 42 divides the interior of the hook into two sections: the tape or fabric receiving section 33 and a wire receiving section 46. The long leg 16, short leg 18, separator arm 42 and separating flange 44 combine to define the wire retaining section 46. The flange 44 is also made of a resilient material and is sufficiently separated from the short leg 18 to create a passage 48 through which a suspension wire (not shown) is passed which then enters the wire receiving section 46 and is thereby separated from the reinforcing tape and/or the roof fabric material which is contained in the tape receiving section 33. Further, the separator arm 42 and flange 44 of the preferred embodiment combine to prevent the wire from being dislodged from the wire receiving section 46 in the course of normal movement of the hook when the roof material of the greenhouse is opened and closed.

The locking system of the hook 10 will now be described. To lock the hook to prevent the reinforcing tape, or roof fabric, and suspension wire from being disengaged from the hook, the pin 22 is first manipulated in a direction transverse to the short leg 18 and in a direction towards the short leg so as to insert the head 28 into the recess 34. The rear wall 39 prevents the head from passing through the recess. After such insertion, the resiliency of the hook body exerts a force on the head 28 of the pin 22 in a direction away from the short leg 18 and in the plane of the hook body thereby causing shoulders 32 of the pin head 28 against the first retaining walls 36. In this manner, the head 28 is trapped in a notch 41 defined by the retaining walls 36 and 38 and the rear wall 39. In this position, the face 40 of the head impinges against second retaining walls 38 and therefore locks the head 28 within the recess 34. To unlock the hook, the head 28 is disengaged from the notch 41 by forcing the pin in a direction towards the short leg 18, in the plane of the hook body, thereby allowing the face 40 of the head 28 to clear the second retaining walls 38. The pin 22 is then forced in a direction transverse to the plane of the hook body until the head 28 is able to be withdrawn from the recess 34. When in the locked position, the hook becomes more rigid and resistant to any twisting motion.

In using the hook, the following procedure is followed. Firstly, the pin on a hook, in the open position, is inserted through a reinforcing tape, not shown, which is forced into the tape receiving section 33. The tape is then attached to the roof fabric. A suspension wire is then entered into the hook and forced through the passage 48 into the wire receiving section 46. The hook is then locked as described above.

Figure 4:
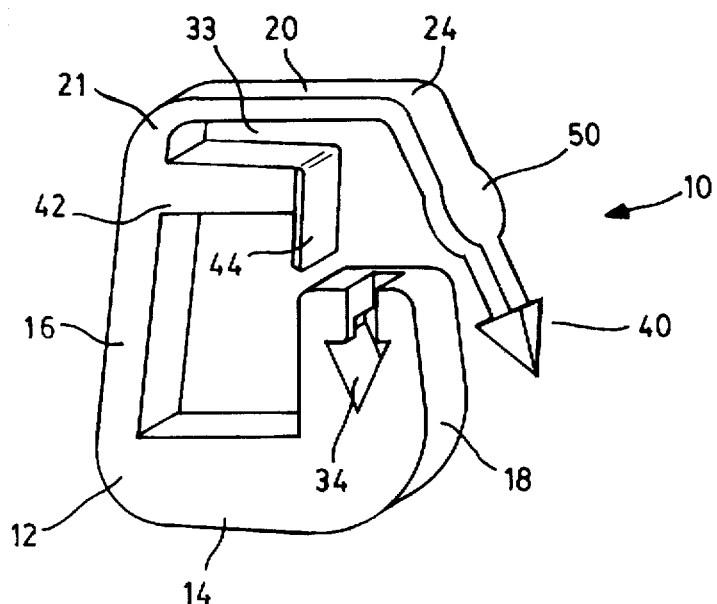
FIG. 4 is a perspective view of the hook of FIG. 2.
Figure 5:
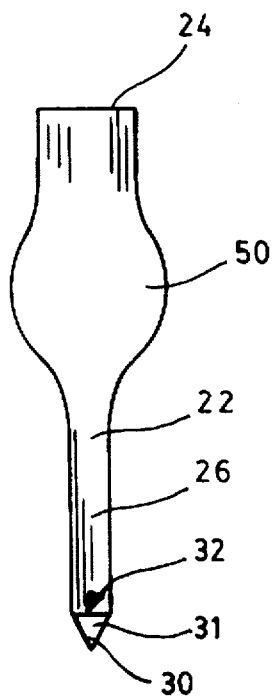
FIG. 5 is a side view of a pin on the hook.

As shown in FIGS. 4 and 5, in the preferred embodiment, the pin 22 further includes an expanded, thumb support portion 50 which is of a greater width than the rest of the pin. Such an expanded portion provides a support to facilitate the locking or unlocking of the hook.

In another embodiment, the hook may be of any shape while maintaining the general characteristics as the preferred embodiment described above.

In another embodiment, the pin may be attached to the body of the hook by a hinge while achieving the same result as the preferred embodiment.

In yet another embodiment, a hook may be designed without a separating flange on the separator arm 42. In such case, the separator arm 42 would extend up to the short leg 18 creating a passage similar to that shown in FIG. 2. The retaining arm would be made of a resilient material to allow a suspension wire to be passed through the passage and be trapped in the wire retaining section.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A hook for suspending a fabric roof covering from a support, said hook comprising a body generally in the form of a loop capable of being opened and closed, said body having:

a first end comprising a pin for engaging said fabric;

an opposing second end including a lock for engaging said pin; and a separator integral with said body and extending towards the center of said loop from a position on said body between said ends for separating said loop into first and second sections;

wherein said first section is adapted to receive said fabric and said second section is adapted to receive said support; and wherein said separator prevents contact between said fabric and said support.

2. The hook of claim 1 wherein said hook body is comprised of a resilient material.

3. The hook of claim 2 wherein said pin includes a head of an arrowhead shape.

4. The hook of claim 3 wherein said lock comprises a recess for receiving said head.

5. The hook of claim 4 wherein said pin includes a thumb support portion for assisting in engaging said head in said recess.

6. The hook of claim 5 wherein said separator comprises an arm which extends to said second end.

7. The hook of claim 1 wherein said separator comprises an arm which extends to said second end.

8. The hook of claim 7 wherein said hook further includes a flange depends from said arm towards said second end.

9. The hook of claim 8 wherein said hook body is comprised of a resilient material.

10. A hook for suspending a fabric roof covering from a support, said hook comprising a body generally in the form of a loop capable of being opened and closed, said body being comprised of a resilient material and having:

a first end comprising a pin for engaging a portion said fabric;

an opposing second end including a lock for engaging said pin;

a separator integral with said body and extending towards the center of said loop from a position on said body between said ends for separating said loop into a first, fabric receiving section and a second, support receiving section;

said separator comprising an arm which extends to said second end; and said separator including a flange which depends from said arm towards said second end.

11. The hook of claim 10 wherein said pin includes a head of an arrowhead shape.

12. The hook of claim 11 wherein said lock comprises a recess for receiving said head.

13. The hook of claim 12 wherein said lock further comprises a notch for releasably retaining said head.

14. The hook of claim 13 wherein said pin includes a thumb support portion for assisting in engaging said head in said recess.

* * * * *